US012649414B2

(12) United States Patent (10) Patent No.: US 12,649,414 B2

Kim (45) Date of Patent: Jun. 9, 2026

(54) HYBRID COMMUNICATION LAMP

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 10 days.

(21) Appl. No.: 18/487,852

(22) Filed: Oct. 16, 2023

(65) Prior Publication Data

US 2024/0166123 A1 May 23, 2024

(30) Foreign Application Priority Data

Nov. 16, 2022 (KR) ........................ 10-2022-0153653

(51) Int. Cl.
B60Q 1/50 (2006.01)
B60Q 1/08 (2006.01)

(52) U.S. Cl.
CPC ................ B60Q 1/50 (2013.01); B60Q 1/08 (2013.01)

(58) Field of Classification Search
CPC .......... B60Q 1/50; B60Q 1/08; B60Q 1/1423
See application file for complete search history.

(56) References Cited

U.S. PATENT DOCUMENTS

| | | | | |
|---|---|---|---|---|
| 5,581,271 A * | 12/1996 | Kraemer | ................ | G09B 9/307 340/980 |
| 6,570,623 B1 * | 5/2003 | Li | ........................ | H04N 9/3194 348/E5.142 |

| | | | | |
|---|---|---|---|---|
| 6,822,563 B2 * | 11/2004 | Bos | ...................... | H04N 13/239 348/42 |
| 6,993,255 B2 * | 1/2006 | Braun | .................. | G01C 11/025 396/164 |
| 7,193,654 B2 * | 3/2007 | Baker | .................. | H04N 9/3147 345/1.3 |
| 8,292,481 B2 * | 10/2012 | Gotz | ..................... | F21S 41/663 362/544 |
| 8,866,387 B2 * | 10/2014 | Futamura | ............... | B60Q 1/143 315/80 |
| 9,845,048 B1 * | 12/2017 | Tseng | ..................... | B60Q 1/525 |
| 10,134,280 B1 * | 11/2018 | You | ........................ | B60Q 1/525 |
| 10,160,380 B1 * | 12/2018 | Salter | ................... | H05B 47/115 |
| 10,336,242 B2 * | 7/2019 | Canonne | ............... | B60K 35/22 |
| 10,421,389 B2 * | 9/2019 | Nagata | ..................... | B60Q 1/28 |
| 10,442,342 B2 * | 10/2019 | Mouri | ................... | B60Q 1/085 |
| 10,596,956 B1 * | 3/2020 | Ahn | ...................... | F21S 41/143 |
| 10,598,330 B2 * | 3/2020 | Mayer | .................. | F21S 41/663 |
| 10,641,454 B2 * | 5/2020 | Kikuchi | ............... | F21S 41/148 |
| 10,717,384 B2 * | 7/2020 | Yu | .......................... | B60Q 1/507 |
| 10,919,438 B2 * | 2/2021 | Iriba | ................... | B60Q 1/0023 |
| 10,944,944 B2 * | 3/2021 | Beier | .................. | H04N 9/3147 |
| 11,338,729 B2 * | 5/2022 | Verbeke | ................ | B60Q 1/547 |
| 11,585,509 B2 * | 2/2023 | Albou | ................... | B60Q 1/143 |

(Continued)

*Primary Examiner* — Hoi C Lau

(74) *Attorney, Agent, or Firm* — DLA PIPER LLP US

(57) ABSTRACT

A hybrid communication lamp may be manufactured at a low manufacturing cost by including a first lamp that irradiates light with a relatively high resolution and a second lamp that irradiates light with a relatively low resolution, and the control device may control the first lamp and the second lamp to output light for displaying visual images or the like related to various types of information, thereby providing convenience to drivers and pedestrians.

11 Claims, 15 Drawing Sheets

(56)                References Cited

U.S. PATENT DOCUMENTS

| | | | | |
|---|---|---|---|---|
| 11,667,234 | B2* | 6/2023 | Maruyama | B60S 1/66 |
| | | | | 362/555 |
| 11,850,993 | B2* | 12/2023 | Hummel | B60Q 1/143 |
| 11,934,734 | B2* | 3/2024 | Kim | G06F 3/1438 |
| 12,101,861 | B2* | 9/2024 | Kim | H05B 47/155 |
| 12,109,933 | B2* | 10/2024 | Kim | G09G 5/006 |
| 12,159,464 | B2* | 12/2024 | Spinger | F21S 41/663 |
| 12,256,178 | B2* | 3/2025 | Fujimori | H04N 23/61 |
| 2004/0252516 | A1* | 12/2004 | Brun | B60Q 1/0011 |
| | | | | 362/465 |
| 2006/0239024 | A1* | 10/2006 | Valcamp | B60Q 1/12 |
| | | | | 362/558 |
| 2006/0266835 | A1* | 11/2006 | Tanida | H04N 23/58 |
| | | | | 235/462.01 |
| 2008/0198372 | A1* | 8/2008 | Pan | F21S 41/645 |
| | | | | 356/121 |
| 2008/0239746 | A1* | 10/2008 | Wuller | F21S 41/663 |
| | | | | 362/538 |
| 2009/0201694 | A1* | 8/2009 | Okada | F21S 43/40 |
| | | | | 362/516 |
| 2012/0075878 | A1* | 3/2012 | Sato | G03B 35/20 |
| | | | | 362/543 |
| 2014/0007634 | A1* | 1/2014 | Isei | G01B 11/306 |
| | | | | 72/12.8 |
| 2014/0267415 | A1* | 9/2014 | Tang | G06T 11/60 |
| | | | | 345/633 |
| 2015/0237317 | A1* | 8/2015 | Ehara | H04N 23/698 |
| | | | | 348/745 |
| 2015/0377442 | A1* | 12/2015 | Bhakta | F21S 41/25 |
| | | | | 362/516 |
| 2017/0158112 | A1* | 6/2017 | Mouri | B60Q 1/50 |
| 2017/0240096 | A1* | 8/2017 | Ross | G05D 1/0212 |
| 2018/0056853 | A1* | 3/2018 | Muramatsu | H05B 45/375 |
| 2018/0118095 | A1* | 5/2018 | Kunii | B60Q 1/085 |
| 2018/0372295 | A1* | 12/2018 | Kikuchi | F21S 41/153 |
| 2019/0049090 | A1* | 2/2019 | Krishnan | H05B 45/12 |
| 2019/0086065 | A1* | 3/2019 | Hirose | H05B 45/38 |
| 2019/0202344 | A1* | 7/2019 | Maruyama | H05B 47/10 |
| 2020/0207258 | A1* | 7/2020 | Tezuka | F21S 41/143 |
| 2021/0291722 | A1* | 9/2021 | Kulkarni | G01S 15/58 |
| 2022/0009407 | A1* | 1/2022 | Boecker | B60Q 1/44 |
| 2022/0048426 | A1* | 2/2022 | Huester | H04N 9/3188 |
| 2022/0099268 | A1* | 3/2022 | Albou | F21S 41/18 |
| 2022/0307671 | A1* | 9/2022 | Bremer | F21S 43/50 |
| 2022/0400238 | A1* | 12/2022 | Kim | H04N 9/3194 |
| 2023/0019153 | A1* | 1/2023 | Maruyama | B60S 1/66 |
| 2023/0048182 | A1* | 2/2023 | Kim | B60Q 1/0017 |
| 2023/0219485 | A1* | 7/2023 | Kim | H04N 9/3188 |
| | | | | 340/468 |
| 2024/0116427 | A1* | 4/2024 | Kato | H05B 45/44 |
| 2024/0123897 | A1* | 4/2024 | Kim | B60Q 1/143 |
| 2024/0123905 | A1* | 4/2024 | Iida | H04N 7/18 |
| 2024/0157867 | A1* | 5/2024 | Kim | B60Q 1/08 |
| 2024/0166123 | A1* | 5/2024 | Kim | B60Q 1/1407 |
| 2025/0078208 | A1* | 3/2025 | Arai | G06T 5/50 |
| 2025/0091509 | A1* | 3/2025 | Hong | B60Q 3/80 |
| 2025/0153633 | A1* | 5/2025 | Shibata | B60Q 1/30 |

* cited by examiner

FIRST LAMP

SECOND
LAMP

CONTROL
DEVICE

PIXEL RESOLUTION OF
FIRST LIGHT : 10*8

ANGLE OF VIEW OF : HORIZONTAL( 10° )/VERTICAL( 8° )
FIRST LIGHT

PIXEL RESOLUTION OF FIRST LIGHT : 10*8

ANGLE-OF-VIEW RESOLUTION OF FIRST LIGHT:1°

RESOLUTION OF
SECOND LIGHT : 5*4

RESOLUTION OF : 10*8
FIRST LIGHT

AREA WHERE FIRST LIGHT AND SECOND LIGHT OVERLAP

RESOLUTION OF
SECOND LIGHT : 5*4

RESOLUTION OF
FIRST LIGHT : 10*8

CONTROL IN UNIT OF 1 PIXEL

CONTROL IN UNIT OF 2*2 PIXEL

RESOLUTION OF FIRST LIGHT : 10*8

RESOLUTION OF SECOND LIGHT : 5*4

AREA WHERE FIRST LIGHT AND SECOND LIGHT OVERLAP

CONTROL IN UNIT OF 1 PIXEL

CONTROL IN UNIT OF 2*2 PIXEL

CONTROL BY DIVIDING FIRST LAMP INTO TWO AREAS

HYBRID COMMUNICATION LAMP

CROSS-REFERENCE TO RELATED APPLICATIONS

This application claims priority under 35 U.S.C. §119 to Korean Patent Application No. 10-2022-0153653, filed on Nov. 16, 2022, in the Korean Intellectual Property Office, the disclosure of which is incorporated herein by reference in its entirety.

TECHNICAL FIELD

The following disclosure relates to a hybrid communication lamp, and more particularly, to a hybrid communication lamp including a first lamp and a second lamp installed in a vehicle, in which the first lamp irradiates light with a relatively high resolution and the second lamp irradiates light with a relatively low resolution.

BACKGROUND

A vehicle is a means of transportation that moves a user in a desired direction when the user gets into the vehicle.

Head lamps, rear combination lamps, direction indicators, interior lights, etc., may be installed as lighting devices in such vehicles, and the vehicle lighting device may perform a function of securing visibility or transmitting signals related to driving information to other vehicles.

Recently, the lighting device of the vehicle has been developed to perform a function of transmitting information to a driver, a driver of another vehicle, a pedestrian, and the like, in addition to a function of securing visibility or transmitting a signal related to driving information.

FIG. 1 is a diagram illustrating a vehicle that outputs light for displaying a visual image with a lighting device.

For example, as illustrated in FIG. 1, the vehicle lighting device may output light displaying a visual image of a snow shape when the vehicle drives on an ice road.

As such, the vehicle lighting device can provide convenience to drivers, pedestrians, etc., by outputting light for displaying visual images related to various types of information. When both lamps used in the vehicle lighting device are composed of a high-resolution DMD system, manufacturing cost of the high-resolution DMD system increases, so there is a problem in that the manufacturing cost of the vehicle lighting device increases.

Therefore, there is a need to develop a vehicle lighting device that can provide convenience to drivers, pedestrians, and the like by outputting light for displaying visual images or the like related to various types of information and can be manufactured at a low manufacturing cost.

SUMMARY

An embodiment of the present disclosure is directed to providing a hybrid communication lamp that can be manufactured at a low manufacturing cost while providing convenience to a driver, a pedestrian, and the like by outputting light for displaying visual images related to various types of information.

Aspects of the present disclosure are not limited to the above-mentioned aspects. That is, other aspects that are not described may be obviously understood by those skilled in the art from the following specification.

In one general aspect, a hybrid communication lamp includes: a first lamp configured to irradiate first light having a first angle of view and a first angle-of-view resolution and output an image displaying road surface information with the radiated first light; a second lamp configured to irradiate second light having a second angle of view and a second angle-of-view resolution and output the image with the radiated second light; and a control device configured to control the first lamp to change the first angle of view of the first light, the first angle-of-view resolution, a position where the first light is irradiated, and a position where the image is output and control the second lamp to change the second angle of view of the second light, the second angle-of-view resolution, a position where the second light is irradiated, and a position where the image is output, in which the first angle-of-view resolution is at least two times greater than the second angle-of-view resolution.

The control device may control the first lamp and the second lamp so that only the first lamp outputs the image, and control the second lamp so that the second lamp outputs a high beam.

The control device may control the second lamp so that the second lamp outputs an adaptive driving beam.

The control device may control the first lamp and the second lamp so that only one of the first lamp and the second lamp outputs the image.

The control device may control the first lamp and the second lamp so that the first angle of view and the second angle of view are the same.

The control device may control the first lamp and the second lamp so that the first angle-of-view resolution and the second angle-of-view resolution are the same.

The control device may control the first lamp and the second lamp so that the image is output to a remaining area other than an area where an area to which the first light is irradiated and an area to which the second light is irradiated overlap.

The control device may control the first lamp so that a resolution of the first light is equal to a resolution of the second light.

The control device may control the first lamp and the second lamp to output an adaptive driving beam, and control the first lamp so that the resolution of the first light and the resolution of the second light are the same in an area where an area to which the first light is irradiated and an area to which the second light is irradiated overlap, when the first lamp and the second lamp output an adaptive driving beam.

The control device may generate a grid for adjusting an alignment of the first lamp and the second lamp, and generate the grid for adjusting the alignment of the first lamp so that a grid spacing of the first lamp is the same as that of the second lamp, when generating the grid for adjusting the alignment of the first lamp.

The hybrid communication lamp may further include: a first auxiliary lamp configured to radiate third light to widen an irradiation area of a high beam irradiated from a vehicle including the hybrid communication lamp; and a second auxiliary lamp configured to radiate fourth light to widen an irradiation area of a low beam irradiated from the vehicle.

Details of other embodiments for solving the problem are included in the description and drawings of the invention.

[Detailed Description of Main Elements]

Figure 1:
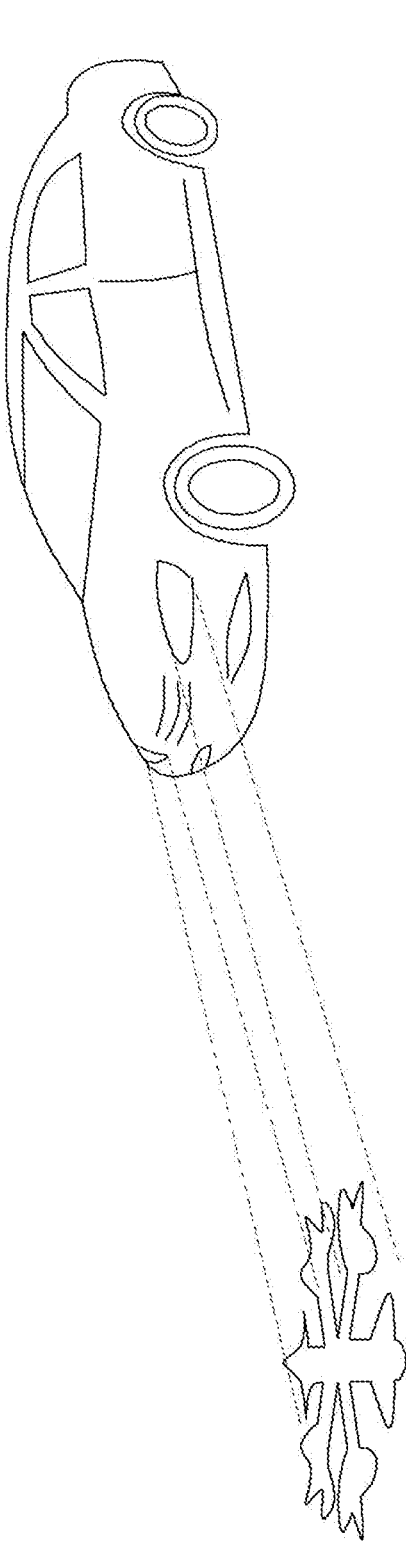
FIG. 1 is a diagram illustrating a vehicle that outputs light for displaying a visual image with a lighting device.

1: Hybrid communication lamp
10: First lamp
20: Second lamp
30: Control device

DETAILED DESCRIPTION OF EMBODIMENTS

Hereinafter, exemplary embodiments of the present disclosure will be described in detail with reference to the accompanying drawings so that those skilled in the art to which the present disclosure pertains may easily practice. However, the present disclosure may be implemented in various different forms, and is not limited to the embodiments described herein. In addition, in the drawings, portions unrelated to the description will be omitted to clearly describe the present disclosure, and similar portions will be denoted by similar reference numerals throughout the specification.

Throughout the present specification, when any one part is referred to as being "connected to" another part, it means that any one part and another part are "directly connected to" each other or are "electrically connected to" each other with still another part interposed therebetween.

Throughout the present specification, when any member is referred to as being positioned "on" other member, it includes not only a case in which any member and another member are in contact with each other, but also a case in which the other member is interposed between any member and another member.

Throughout the present specification, "including" any component will be understood to imply the inclusion of other components rather than the exclusion of other components, unless explicitly described to the contrary. The terms "about," "substantially," and the like used throughout the present specification means figures corresponding to manufacturing and material tolerances specific to the stated meaning and figures close thereto, and are used to prevent unconscionable abusers from unfairly using the disclosure of figures precisely or absolutely described to aid the understanding of the present disclosure. The term "~step" or "~step of" used throughout the present specification of the present disclosure does not mean "~step for."

Hereinafter, embodiments of the present disclosure will be described in detail with reference to the accompanying drawings. However, the present disclosure is not limited to exemplary embodiments herein, but may be implemented in other forms. Same reference numerals denote same constituent elements throughout the specification.

Hereinafter, a hybrid communication lamp according to an embodiment of the present disclosure will be described.

Figure 2:
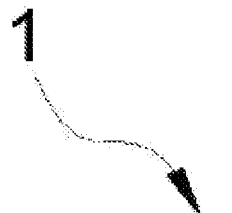
FIG. 2 is a block diagram illustrating a hybrid communication lamp according to an embodiment of the present disclosure.

FIG. 2 is a block diagram illustrating a hybrid communication lamp according to an embodiment of the present disclosure.

Referring to FIG. 2, a hybrid communication lamp 1 includes a first lamp 10, a second lamp 20, and a control device 30.

First, the first lamp 10 will be described.

The first lamp 10 is one of two lamps installed in front of a vehicle, and is a conventional vehicle lamp capable of irradiating light with a relatively high resolution compared to the second lamp 20 to be described later. For example, the first lamp 10 may include a digital micromirror device (DMD).

The first lamp 10 can irradiate first light having a first angle of view and a first angle-of-view resolution and output an image displaying road surface information (hereinafter, referred to as an image) with the radiated first light.

Next, the second lamp 20 will be described.

The second lamp 20 is the other of two lamps installed in front of a vehicle, and may be composed of a conventional vehicle lamp capable of irradiating light with a relatively low resolution compared to the first lamp 10. For example, the second lamp 20 may be composed of a high-definition (HD) lamp, a micro LED lamp, or the like.

The second lamp 20 can irradiate second light having a second angle of view and a second angle-of-view resolution and output an image with the radiated second light.

As such, the vehicle including the hybrid communication lamp 1 irradiates light with two lamps having different resolutions.

Figure 3:
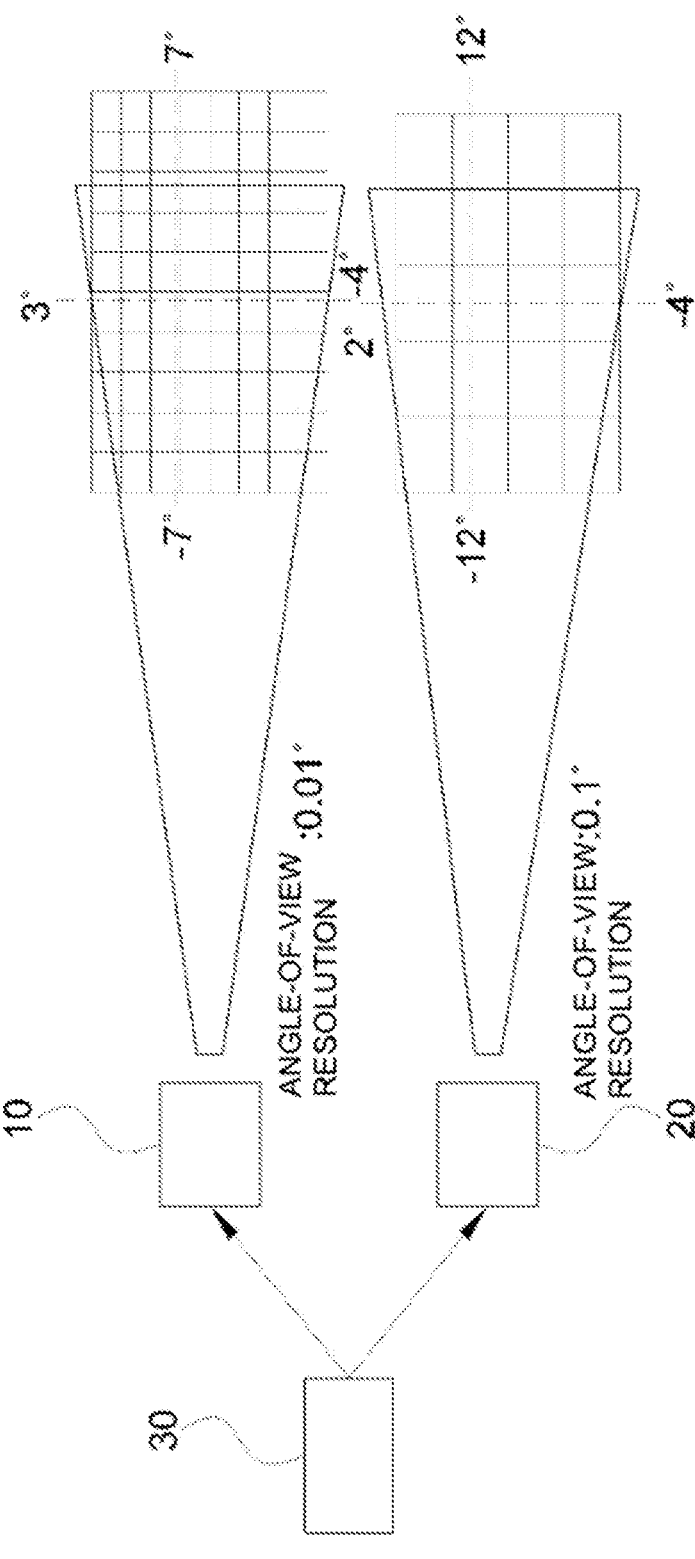
FIG. 3 is a diagram illustrating an example of a first lamp and a second lamp irradiating light having different angle-of-view resolutions.

FIG. 3 is a diagram illustrating an example of a first lamp and a second lamp irradiating light having different angle-of-view resolutions.

For example, referring to FIG. 3, the first lamp 10 installed in the vehicle may forwardly radiate light having a first angle-of-view resolution of 100 pixel/degree, and the second lamp 20 installed in the vehicle may forwardly radiate light having a second angle-of-view resolution of 10 pixel/degree. As used herein, the "angle-of-view resolution" refers to an angular sampling density (e.g., pixels per degree), where a larger value indicates a finer resolution.

In this case, the first angle-of-view resolution may be at least two times greater than the second angle-of-view resolution.

Next, the control device 30 will be described.

The control device 30 may be composed of a conventional computer or the like, and may be installed in a vehicle to control the operation of the first lamp 10 and the second lamp 20.

That is, the control device 30 can control the first lamp 10 to change a first angle of view of the first light irradiated from the first lamp 10, a first angle-of-view resolution, a position where the first light is irradiated, and a position where an image is output.

In addition, the control device 30 can control the second lamp 20 to change a second angle of view of the second light irradiated from the second lamp 20, a second angle-of-view resolution, a position where the second light is irradiated, and a position where an image is output.

Figure 4:
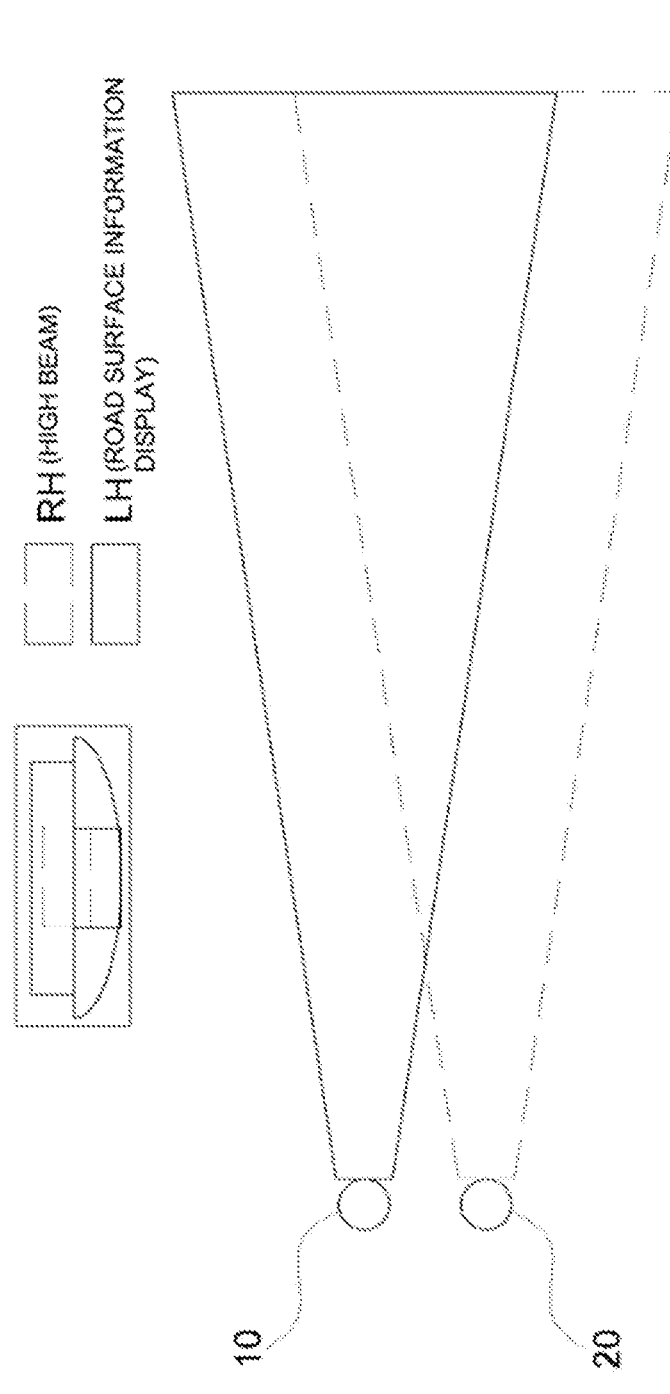
FIG. 4 is a diagram illustrating a hybrid communication lamp in which the first lamp is controlled to irradiate a low beam including an image displaying road surface information and the second lamp is controlled to irradiate a high beam.

FIG. 4 is a diagram illustrating a hybrid communication lamp in which the first lamp is controlled to irradiate a low beam including an image displaying road surface information and the second lamp is controlled to irradiate a high beam.

For example, as illustrated in FIG. 4, the control device 30 may control the first lamp 10 and the second lamp 20 so that only the first lamp 10 outputs an image, and control the second lamp 20 so that the second lamp 20 outputs a high beam.

In this case, the control device 30 may control the second lamp 20 so that the second lamp 20 outputs an adaptive driving beam (ADB).

Figure 5:
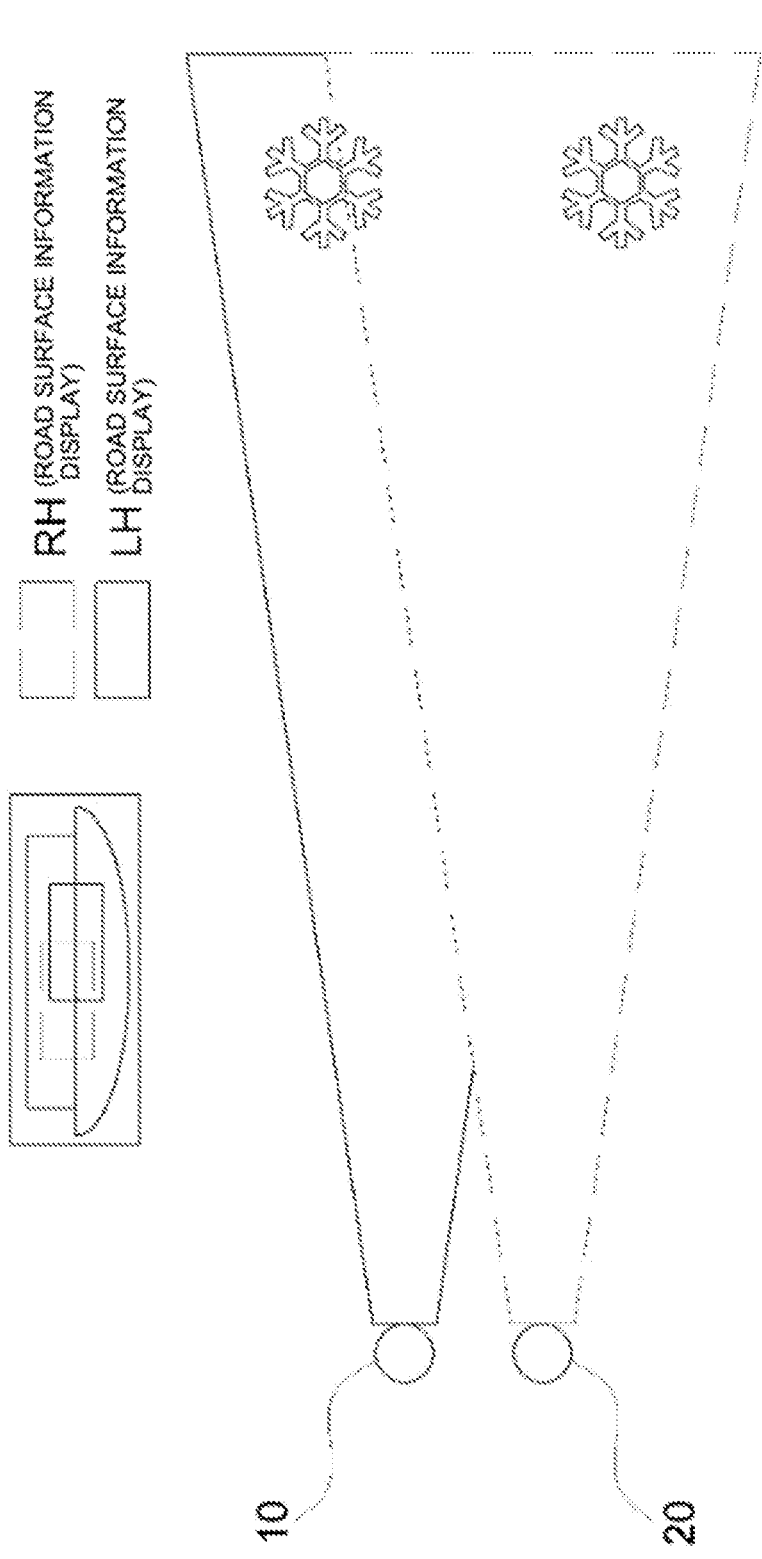
FIG. 5 is a diagram illustrating the hybrid communication lamp in which either the first lamp or the second lamp is controlled to irradiate light including an image displaying the road surface information.

FIG. 5 is a diagram illustrating the hybrid communication lamp in which either the first lamp or the second lamp is controlled to irradiate light including an image displaying the road surface information.

As another example, as illustrated in FIG. 5, the control device 30 may control the first lamp 10 and the second lamp 20 so that only one of the first lamp 10 or the second lamp 20 lamp outputs an image.

Since the light irradiated from the first lamp 10 and the second lamp 20 has different resolutions, when the first lamp 10 and the second lamp 20 irradiate light simultaneously to output an image, the image may be distorted.

Therefore, when only one of the first lamp 10 or the second lamp 20 is controlled to output an image, it is possible to prevent the image from being distorted.

Figure 6A:
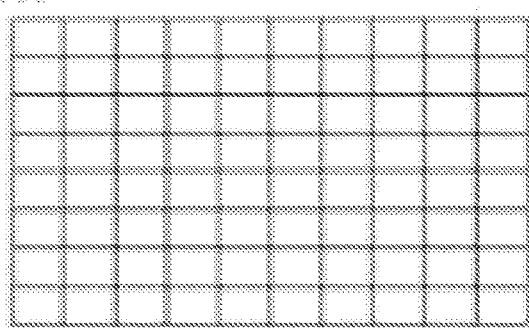
FIGS. 6A and 6B are diagrams illustrating an appearance in which the first lamp and the second lamp are controlled so that a first angle of view and a second angle of view are equal to each other.
Figure 6A:
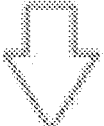
Figure 6A:
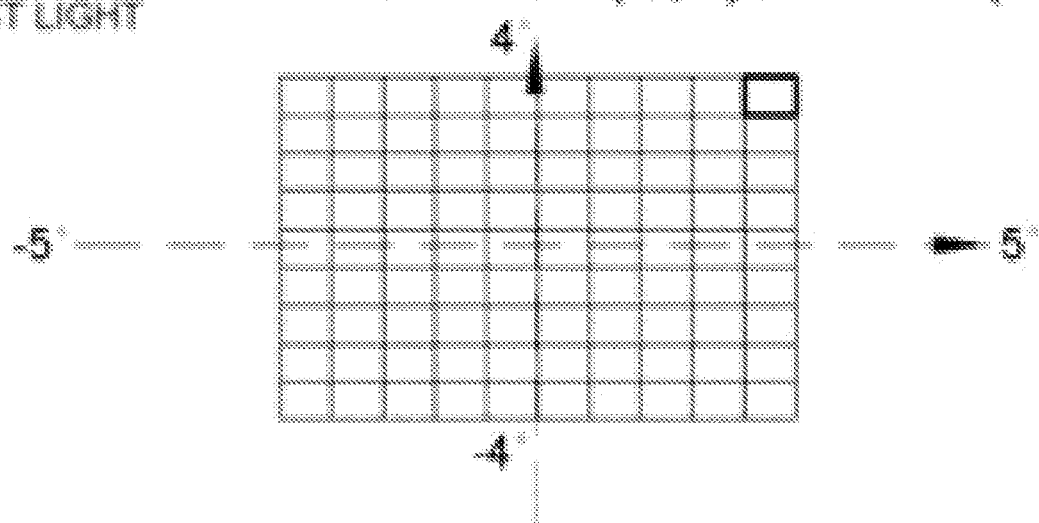
Figure 6B:
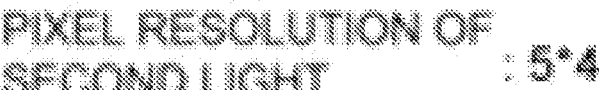
Figure 6B:
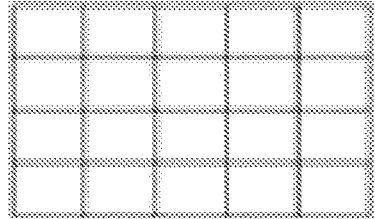
Figure 6B:
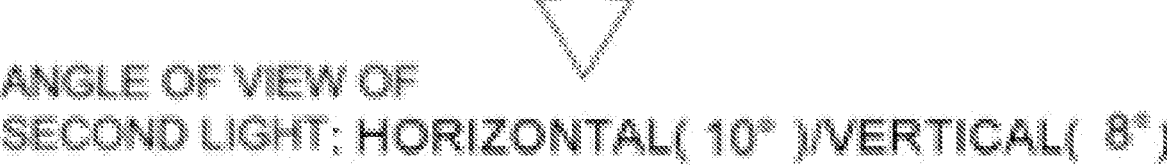
Figure 6B:
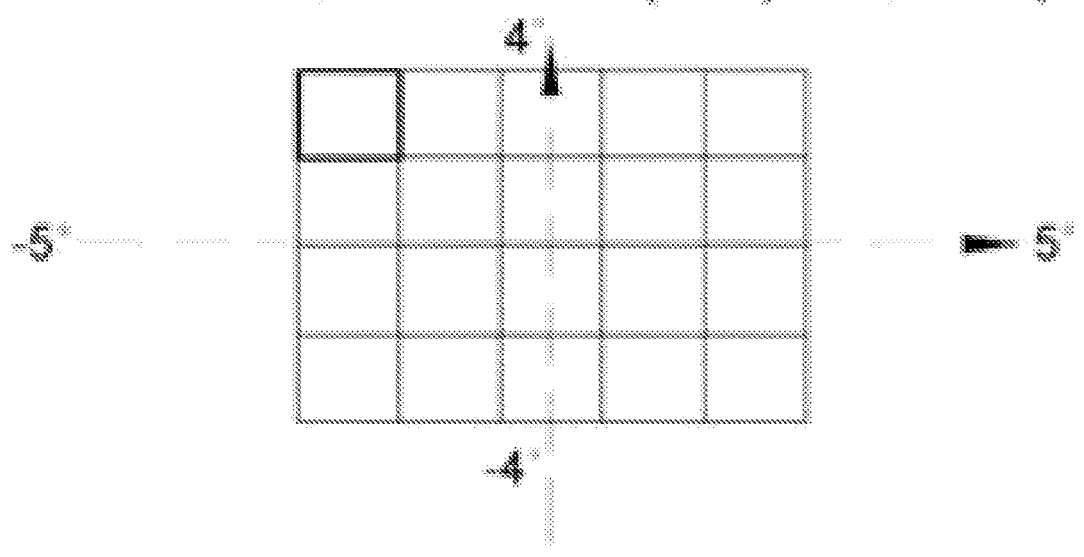

FIGS. 6A and 6B are diagrams illustrating an appearance in which the first lamp and the second lamp are controlled so that a first angle of view and a second angle of view are equal to each other.

As another example, as illustrated in FIGS. 6A and 6B, the control device 30 may control the first lamp 10 and the second lamp 20 so that the first angle of view of the first light is the same as the second angle of view of the second light.

That is, the control device 30 may control the first angle of view of the first light using the conventional optical device or the like (see FIG. 6A) and control the second angle of view of the second light (see FIG. 6B) to prevent an image from being distorted when outputting the image by simultaneously irradiating light from the first lamp 10 and the second lamp 20.

Figure 7A:
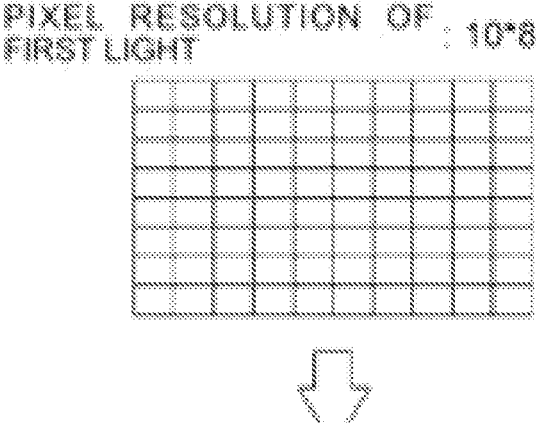
FIGS. 7A and 7B are diagrams illustrating an appearance in which the first lamp and the second lamp are controlled so that a first angle-of-view resolution and a second angle-of-view resolution become equal to each other.
Figure 7A:
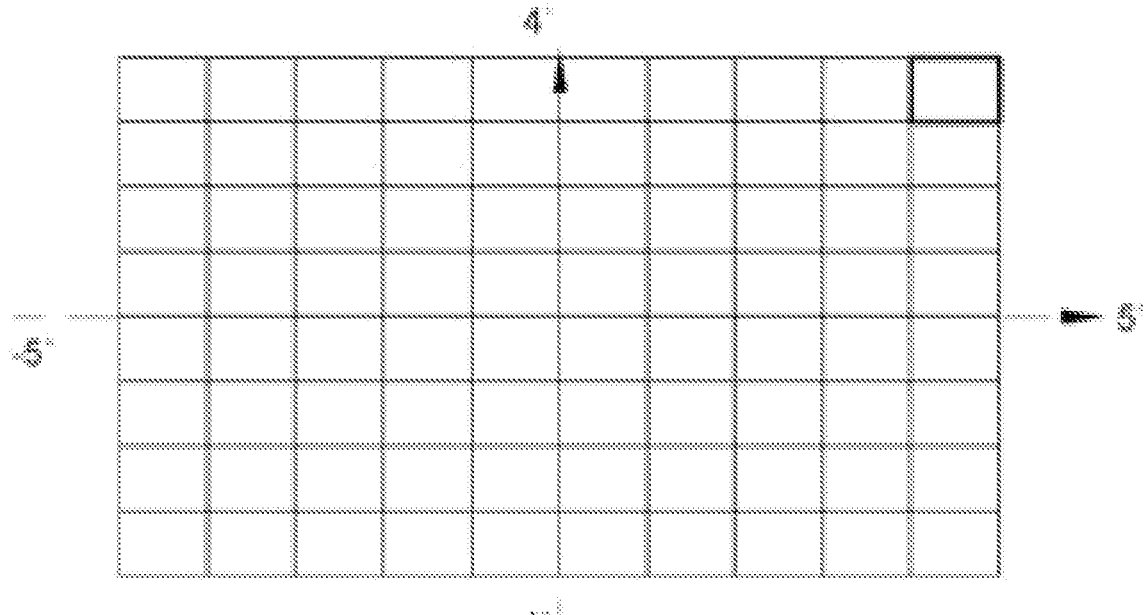
Figure 7B:
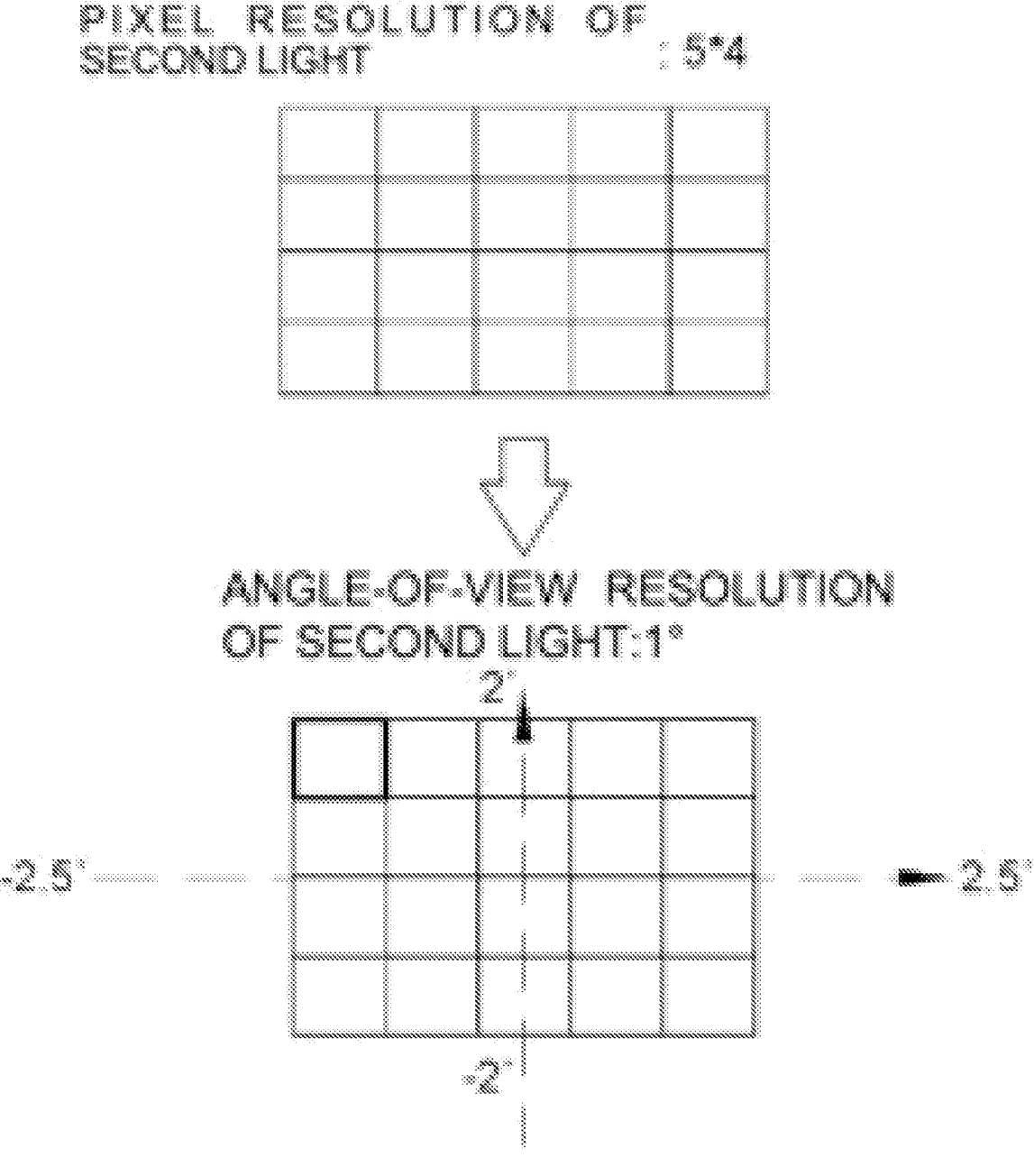

FIGS. 7A and 7B are diagrams illustrating an appearance in which the first lamp and the second lamp are controlled so that a first angle-of-view resolution and a second angle-of-view resolution become equal to each other.

As another example, as illustrated in FIGS. 7A and 7B, the control device 30 may control the first lamp 10 and the second lamp 20 so that the first angle-of-view resolution of the first light is the same as the second angle-of-view resolution of the That is, the control device 30 may control the first angle-of-view resolution of the first light using the conventional optical device or the like (see FIG. 7A) and control the second angle-of-view resolution of the second light (see FIG. 7B) to prevent an image from being distorted when outputting the image by simultaneously irradiating light from the first lamp 10 and the second lamp 20.

Figure 8:
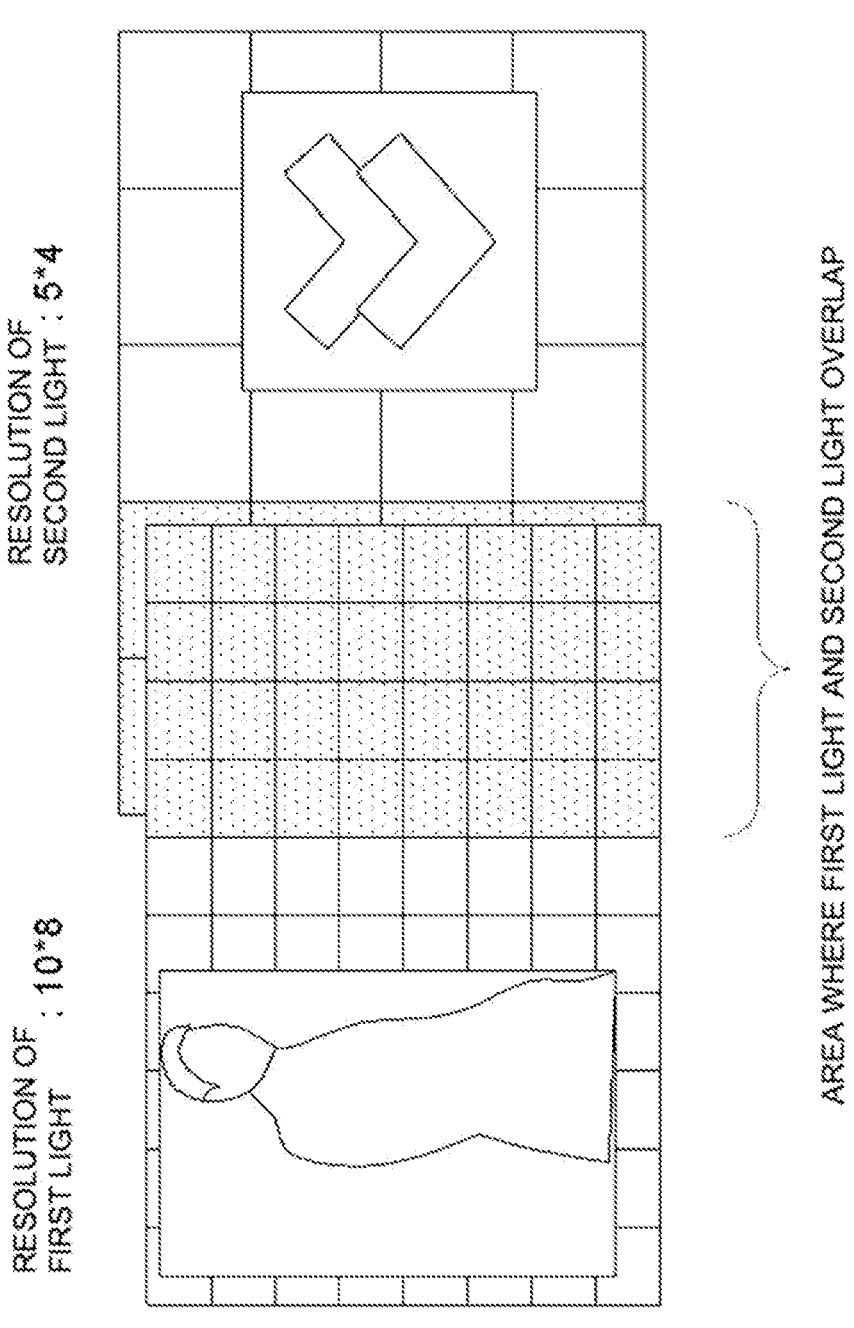
FIG. 8 is a diagram illustrating an area where first light and second light overlap.

FIG. 8 is a diagram illustrating an area where first light and second light overlap.

As another example, as illustrated in FIG. 8, the control device 30 may control the first lamp 10 and the second lamp 20 to output an image to the remaining area other than an area where the area to which the first light is irradiated and the area to which the second light is irradiated overlap.

That is, when the control device 30 needs to simultaneously output images to the front left and right of the vehicle, the control device 30 may control the first lamp 10 and the second lamp 20 so that the image having the first angle-of-view resolution and the image having the second angle-of-view resolution are each output only to the remaining area other than the area where the first light and the second light overlap. Therefore, it is possible to prevent the distorted image from being output to the area where the first light and the second light overlap.

Figure 9:
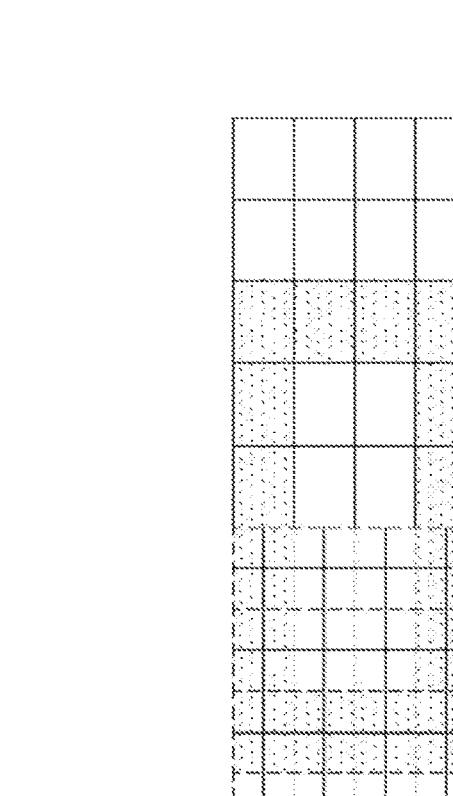
FIG. 9 is a diagram illustrating an appearance in which the first lamp is controlled so that the resolution of the first light becomes the same as that of the second light.
Figure 9:
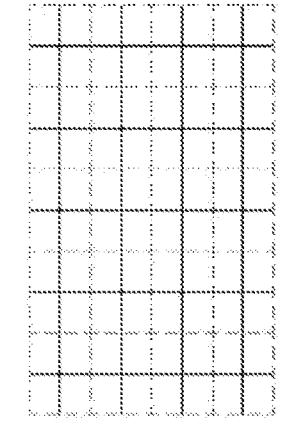

FIG. 9 is a diagram illustrating an appearance in which the first lamp is controlled so that the resolution of the first light becomes the same as that of the second light.

As another example, as illustrated in FIG. 9, the control device 30 may control the first lamp 10 so that the resolution of the first light is the same as that of the In this way, by making the resolution of the first light the same as that of the second light, it is possible to output one image to the first lamp 10 and the second lamp 20 irradiating light having different resolutions without distortion.

Figure 10:
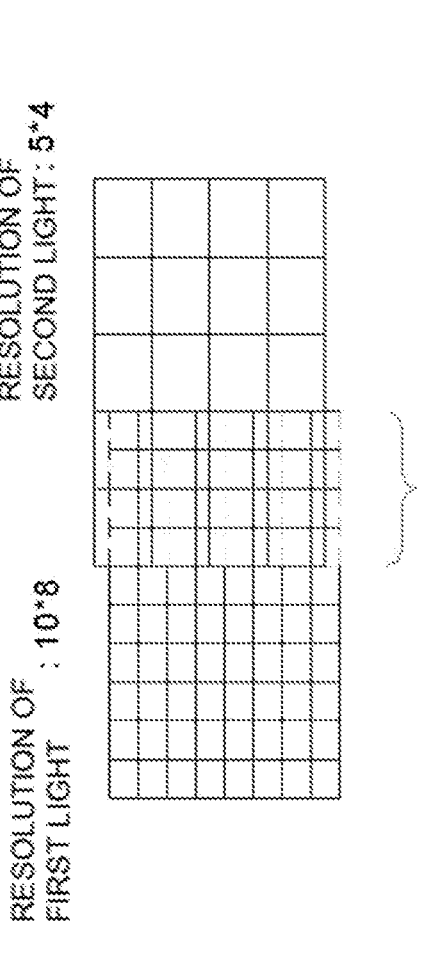
FIG. 10 is a diagram illustrating an appearance in which the first lamp outputting an adaptive driving beam is controlled so that the resolution of the first light is the same as that of the second light in an area where an area to which the first light is irradiated and an area to which the second light is irradiated overlap.
Figure 10:
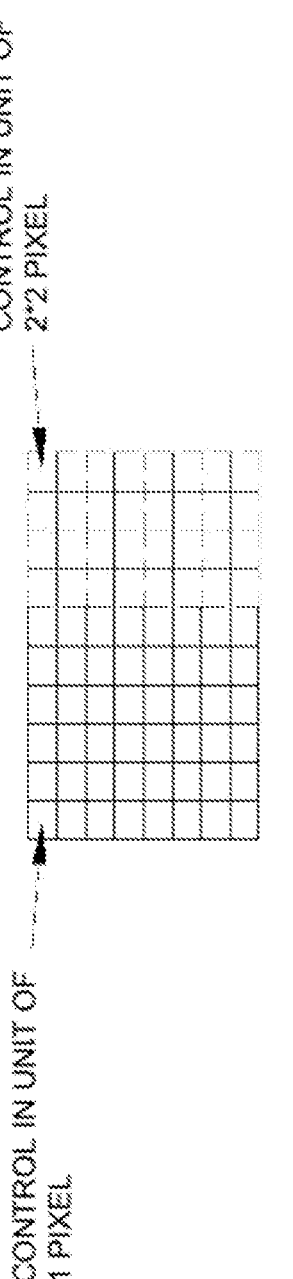

FIG. 10 is a diagram illustrating an appearance in which the first lamp outputting an adaptive driving beam is controlled so that the resolution of the first light is the same as the resolution of the second light in an area where an area to which the first light is irradiated and an area to which the second light is irradiated overlap.

As another example, as illustrated in FIG. 10, the control device 30 may control the first lamp 10 and the second lamp 20 to output the adaptive driving beam (ADB), and control the first lamp 10 so that the resolution of the first light is the same as that of the second light in the area where the area to which the first light is irradiated and the area to which the second light is irradiated overlap, when the first lamp 10 and the second lamp 20 output the adaptive driving beam (ADB).

Figure 11A:
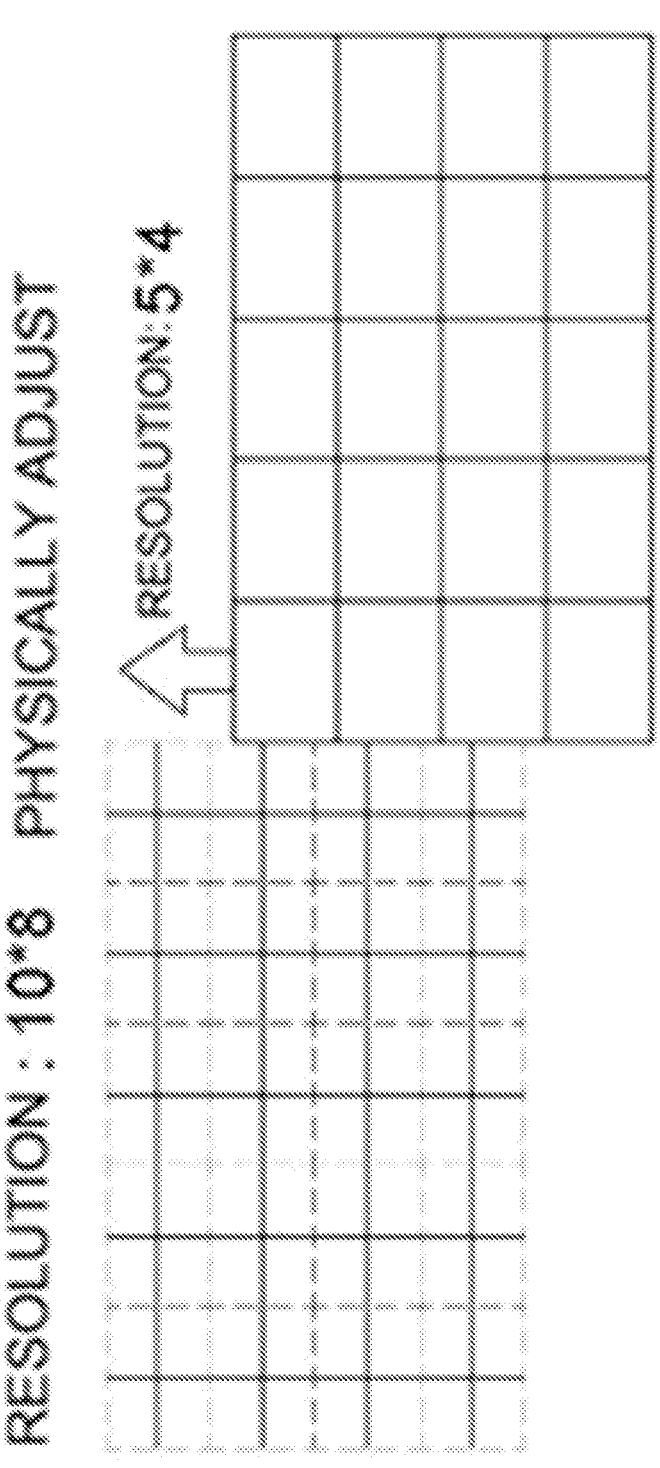
FIGS. 11A and 11B are diagrams illustrating an appearance in which a distortion of grids of the first light and the second light is adjusted.
Figure 11B:
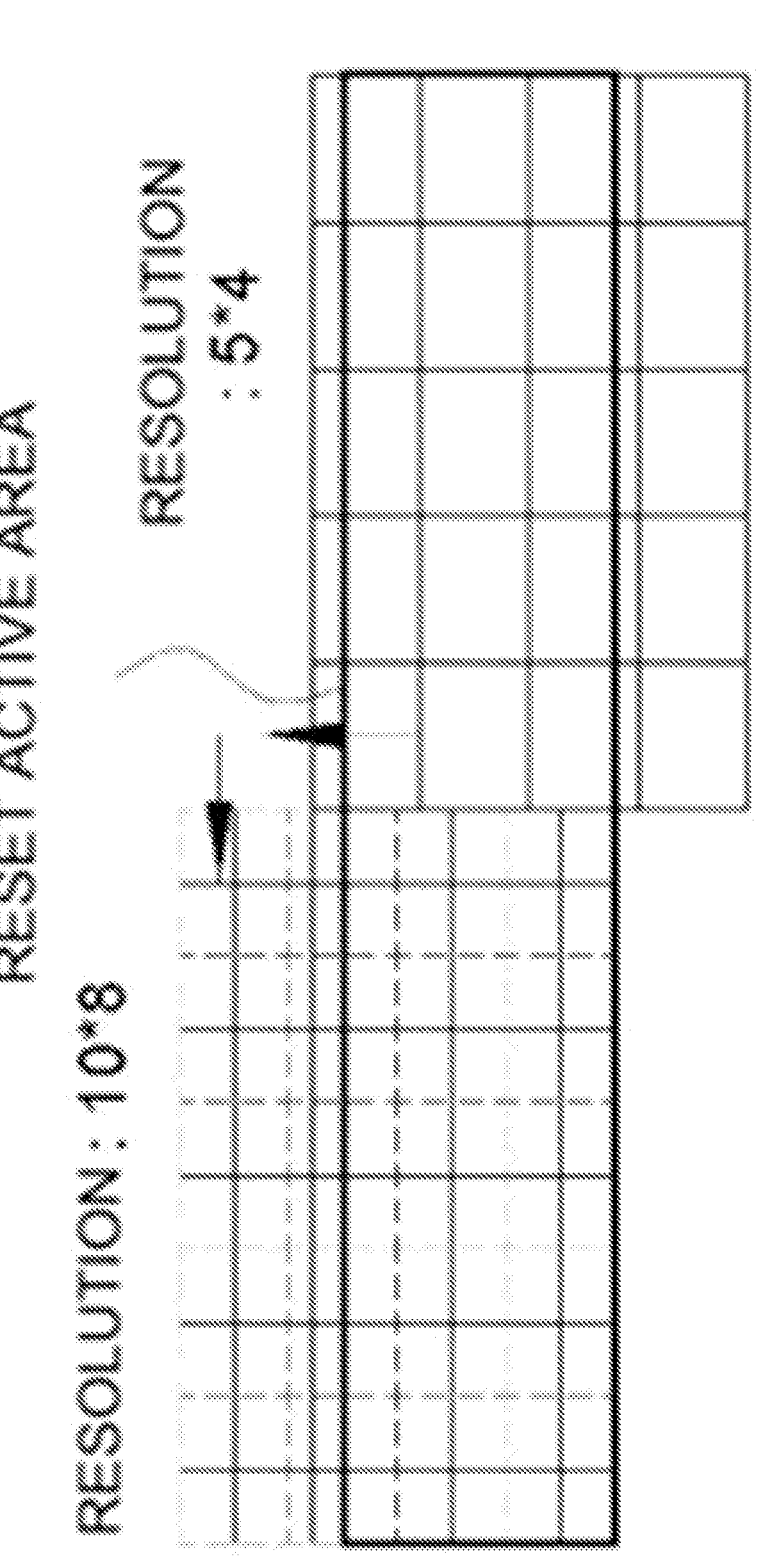

FIGS. 11A and 11B are diagrams illustrating an appearance in which a distortion of grids of the first light and the second light is adjusted.

As another example, as illustrated in FIGS. 11A and 11B, the control device 30 can generate a grid for adjusting alignment of the first lamp 10 and the second lamp 20, and generate a grid for adjusting the alignment of the first lamp 10 so that a grid spacing of the first lamp 10 is the same as that of the second lamp 20 when generating the grid for adjusting the alignment of the first lamp 10.

In addition, in adjusting the alignment, the alignment may be physically adjusted by checking the distorted grid line (see FIG. 11A), and an LED area of the same coordinates in the first lamp 10 and the second lamp 20 may be turned on to check the distorted coordinates using a camera and then reset an active area and change the resolution according to the corresponding pixel (see FIG. 11B).

Figure 12:
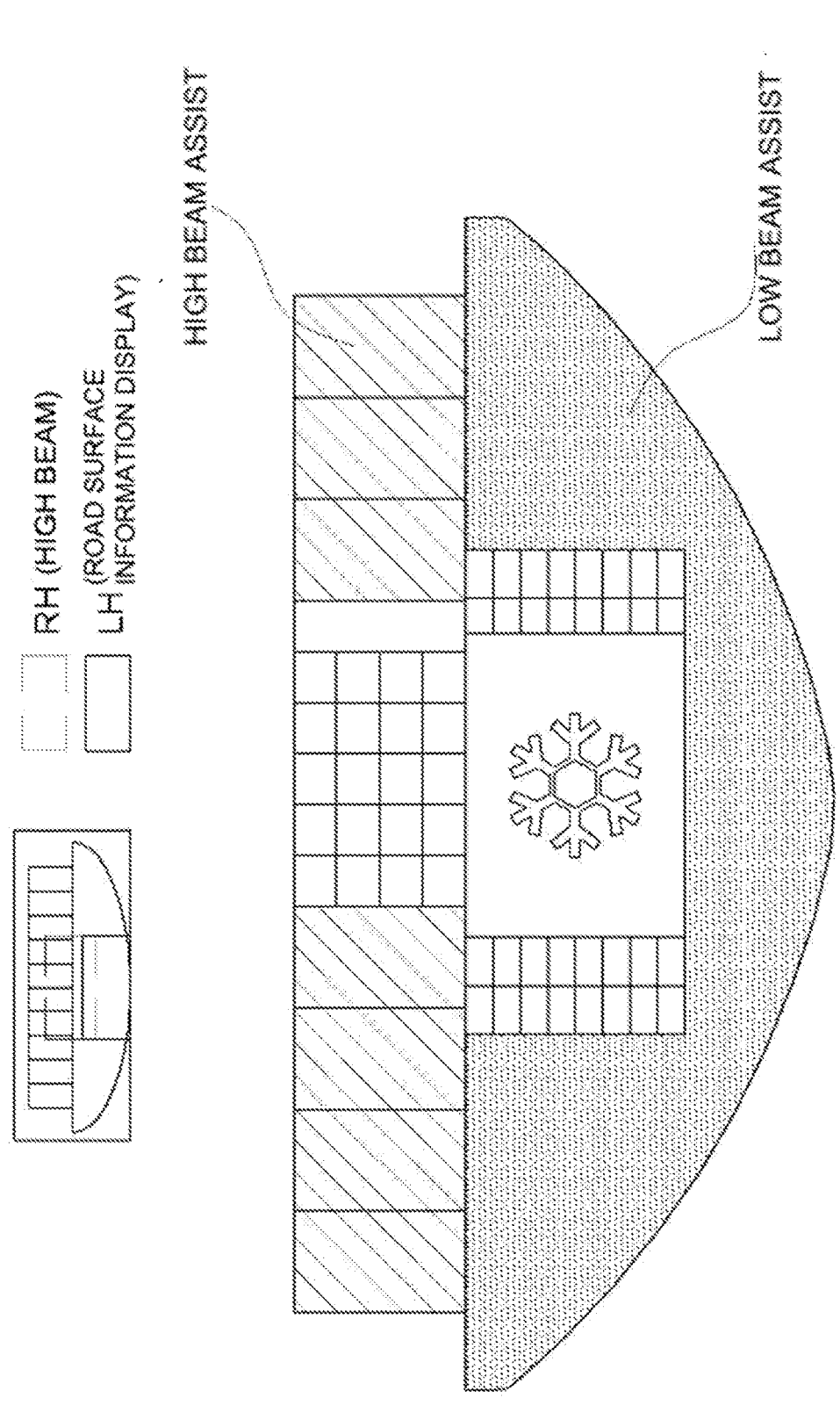
FIG. 12 is a diagram illustrating an appearance in which an area in which a high beam is irradiated is expanded by third light irradiated by a first auxiliary lamp and an area in which a low beam is irradiated is expanded by a fourth light irradiated by a second auxiliary lamp.

FIG. 12 is a diagram illustrating an appearance in which an area in which a high beam is irradiated is expanded by third light irradiated by a first auxiliary lamp and an area in which a low beam is irradiated is expanded by a fourth light irradiated by a second auxiliary lamp.

Meanwhile, as illustrated in FIG. 12, the hybrid communication lamp 1 may include a first auxiliary lamp and a second auxiliary lamp.

Specifically, the first auxiliary lamp may irradiate third light to widen the irradiation area of the high beam irradiated from the vehicle including the hybrid communication lamp 1, and the conventional vehicle lighting device or the like may be used.

The second auxiliary lamp may irradiate fourth light to widen the irradiation area of the low beam irradiated from the vehicle including the hybrid communication lamp 1, and the conventional vehicle lighting device or the like may be used.

When the hybrid communication lamp 1 includes the first auxiliary lamp and the second auxiliary lamp, the hybrid communication lamp 1 may satisfy light distribution regulations even when the first lamp 10 and the second lamp 20 are set to have a narrow angle of view so that the image quality output from the first lamp 10 and the second lamp 20 is improved.

As described above, since the hybrid communication lamp according to the present disclosure is composed of a combination of a lamp having a high resolution and a lamp having a low resolution, the hybrid communication lamp outputs light displaying visual images or the like related to various types of information while lowering manufacturing cost, thereby providing convenience to drivers, pedestrians, and the like.

The above description of the present disclosure is for illustrative purposes, and those skilled in the art to which the present disclosure pertains will understand that it may be easily modified to other specific forms without changing the technical spirit or essential features of the present disclosure. Therefore, it should be understood that the above-mentioned exemplary embodiments are exemplary in all aspects but are not limited thereto. For example, each component described as a single type may be implemented in a distributed manner, and similarly, components described as distributed may be implemented in a combined form.

According to the solution to the problem of the present disclosure described above, since the hybrid communication lamp according to the present disclosure is composed of a combination of a lamp having a high resolution and a lamp having a low resolution, the hybrid communication lamp outputs light displaying visual images or the like related to various types of information while lowering manufacturing cost, thereby providing convenience to drivers, pedestrians, and the like.

It is to be understood that the scope of the present disclosure will be defined by the claims rather than the above-described description and all modifications and alternations derived from the claims and their equivalents are included in the scope of the present disclosure.

What is claimed is:

1. A hybrid communication lamp, comprising:
a first lamp configured to irradiate first light having a first angle of view and a first angle-of-view resolution and output an image displaying road surface information with the first light;

a second lamp configured to irradiate second light having a second angle of view and a second angle-of-view resolution; and a control device configured to control the first lamp to change a region position where the first light is irradiated, and control the second lamp to change a region where the second light is irradiated, wherein the first angle-of-view resolution is at least two times greater than the second angle-of-view resolution, wherein the control device is configured to control the first lamp and the second lamp so that the first lamp exclusively outputs the image, and control the first lamp and the second lamp to output an adaptive driving beam.

2. The hybrid communication lamp of claim 1, wherein the control device is configured to control the first lamp and the second lamp so that only the first lamp outputs the image, and control the second lamp so that the second lamp outputs a high beam.

3. The hybrid communication lamp of claim 2, wherein the control device is configured to control the second lamp so that the second lamp outputs an adaptive driving beam.

4. The hybrid communication lamp of claim 1, wherein the control device is configured to control the first lamp and the second lamp so that only one of the first lamp and the second lamp outputs the image.

5. The hybrid communication lamp of claim 1, wherein the control device is configured to control the first lamp and the second lamp so that the first angle of view and the second angle of view are the same.

6. The hybrid communication lamp of claim 1, wherein the control device is configured to control the first lamp and the second lamp so that the first angle-of-view resolution and the second angle-of-view resolution are the same.

7. The hybrid communication lamp of claim 1, wherein the control device is configured to control the first lamp and the second lamp so that the image is output to a remaining area other than an area where an area to which the first light is irradiated and an area to which the second light is irradiated overlap.

8. The hybrid communication lamp of claim 1, wherein the control device is configured to control the first lamp so that a resolution of the first light is equal to a resolution of the second light.

9. The hybrid communication lamp of claim 1, wherein the control device is configured to:

control the first lamp and the second lamp to output an adaptive driving beam, and control the first lamp so that the resolution of the first light and the resolution of the second light are the same in an area where an area to which the first light is irradiated and an area to which the second light is irradiated overlap, when the first lamp and the second lamp output the adaptive driving beam.

10. The hybrid communication lamp of claim 1, wherein the control device is configured to:

generate a grid for adjusting an alignment of the first lamp and the second lamp, and generate the grid for adjusting the alignment of the first lamp so that a grid spacing of the first lamp is the same as that of the second lamp, when generating the grid for adjusting the alignment of the first lamp.

11. The hybrid communication lamp of claim 1, further comprising:

a first auxiliary lamp configured to radiate third light to widen an irradiation area of a high beam irradiated from a vehicle including the hybrid communication lamp; and a second auxiliary lamp configured to radiate fourth light to widen an irradiation area of a low beam irradiated from the vehicle.

\* \* \* \* \*